(12) United States Patent
Nakamoto et al.

(10) Patent No.: US 7,873,439 B2
(45) Date of Patent: Jan. 18, 2011

(54) ROBOT TURNING COMPENSATING ANGLE ERROR USING IMAGING

(75) Inventors: Hideichi Nakamoto, Kanagawa-ken (JP); Kaoru Suzuki, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1104 days.

(21) Appl. No.: 11/387,823

(22) Filed: Mar. 24, 2006

(65) Prior Publication Data

US 2008/0009975 A1 Jan. 10, 2008

(30) Foreign Application Priority Data

Mar. 24, 2005 (JP) ............................... 2005-085977

(51) Int. Cl.
*G05B 15/00* (2006.01)
(52) U.S. Cl. .......................... 700/259; 700/254; 701/28
(58) Field of Classification Search ................. 700/245, 700/254, 258, 259
See application file for complete search history.

(56) References Cited

U.S. PATENT DOCUMENTS

| 4,815,008 | A | * | 3/1989 | Kadonoff et al. | ............... | 701/23 |
|---|---|---|---|---|---|---|
| 5,062,696 | A | * | 11/1991 | Oshima et al. | ............... | 359/554 |
| 5,465,525 | A | * | 11/1995 | Mifune et al. | ............... | 43/132.1 |
| 6,708,068 | B1 | * | 3/2004 | Sakaue | ........................ | 700/47 |
| 2004/0016077 | A1 | * | 1/2004 | Song et al. | ..................... | 15/319 |
| 2005/0015265 | A1 | * | 1/2005 | Price | .............................. | 705/1 |
| 2005/0267631 | A1 | * | 12/2005 | Lee et al. | ..................... | 700/245 |
| 2006/0241808 | A1 | * | 10/2006 | Nakadai et al. | ............. | 700/245 |

FOREIGN PATENT DOCUMENTS

| JP | 8-221123 | | 8/1996 |
|---|---|---|---|
| JP | 2000-79587 | | 3/2000 |
| JP | 2003-117867 | | 4/2003 |
| JP | 2003-266351 | | 9/2003 |
| JP | 2003-305676 | | 10/2003 |
| JP | 2004-106079 | | 4/2004 |
| JP | 2004106079 A | * | 4/2004 |

* cited by examiner

*Primary Examiner*—Thomas G Black
*Assistant Examiner*—Sze-Hon Kong
(74) *Attorney, Agent, or Firm*—Oblon, Spivak, McClelland, Maier & Neustadt, L.L.P.

(57) ABSTRACT

A robot apparatus includes a moving unit configured to move in a moving plane on flooring, and turn in horizontal direction of the flooring about a rotation axis vertical to the flooring; an imaging unit configured to take images in a direction horizontal to the moving plane, and rotate in horizontal direction of the flooring about the rotation axis; a storage unit configured to store the image taken by the image processor when the moving unit receives a turning request of a command angle; a detector configured to detect a rotation angle of the imaging unit relative to the moving unit; a controller configured to control a turning of the moving unit and a rotating of the imaging unit based on a common value which makes the moving unit turn in a direction of the command angle and which makes the imaging unit rotate in an opposite direction, and based on a rate value which changes turning of the moving unit or rotating of the imaging unit so as to compensate a gap determined by comparing the taken image with the stored image; and a stop unit configured to stop the turning of the moving unit and the rotating of the imaging unit, when the command angle corresponds to the rotation angle detected by the detector.

8 Claims, 10 Drawing Sheets

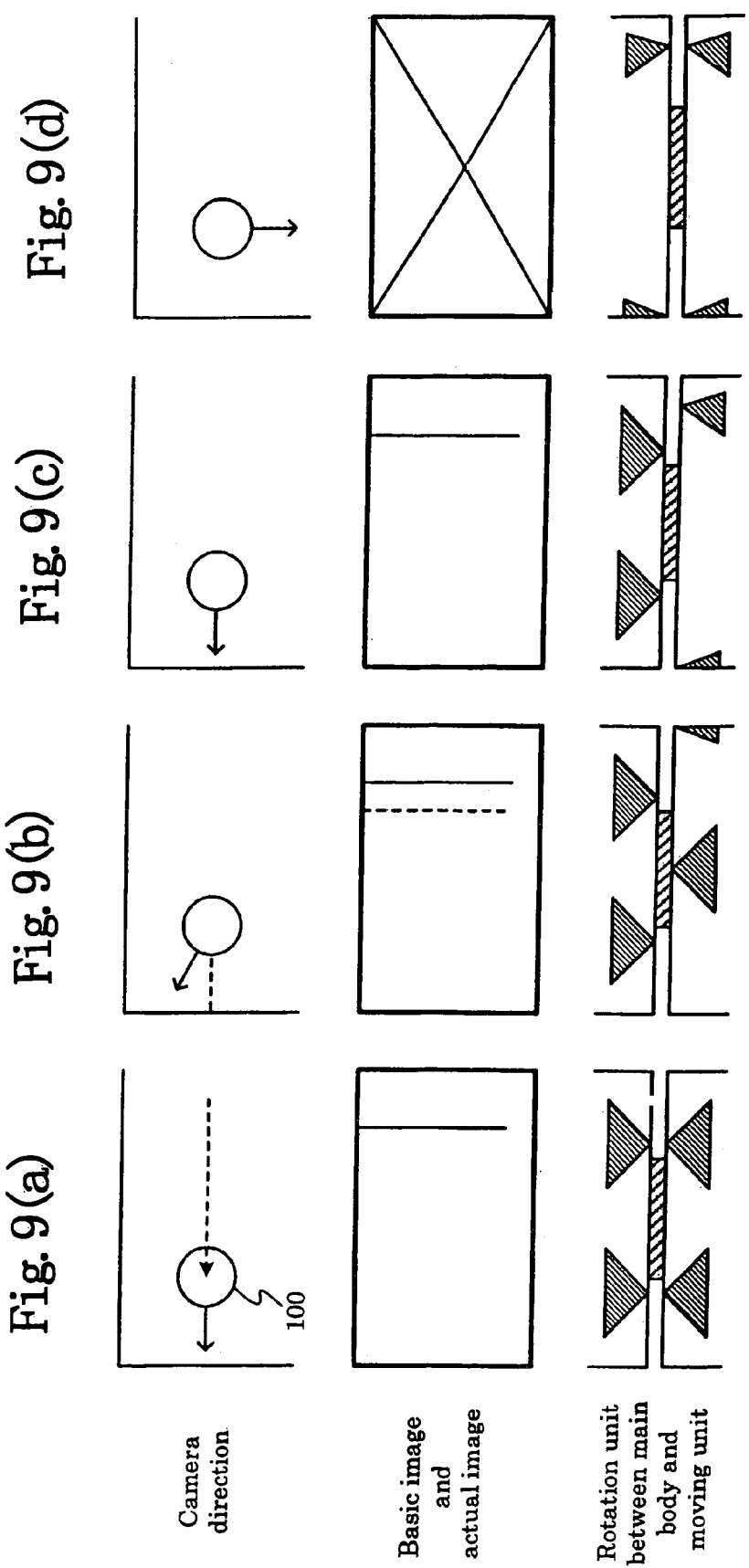

ROBOT TURNING COMPENSATING ANGLE ERROR USING IMAGING

CROSS-REFERENCE TO RELATED APPLICATIONS

This application is based upon and claims the benefit of priority from the prior Japanese Patent Application No. 2005-85977, filed on Mar. 24, 2005; the entire contents of which are incorporated herein by reference.

BACKGROUND OF THE INVENTION

1. Field of the Invention

The present invention relates to the robot apparatus which moves on a floor and, more particularly, to the robot apparatus, a method for turning the robot apparatus, and a computer program product which can cause the robot to turn a commanded angle correctly by compensating for a skid on the floor.

2. Description of the Related Art

Moving methods for moving a robot apparatus are roughly categorized into two categories.

One robot apparatus moves along a route set exterior to the robot apparatus by a rail on which the robot travels, and another robot apparatus moves unconstrained by an exterior structure and moves autonomously based on a programmed moving function controlling movement of legs or wheels of the robot.

Since the former has a fixed route, a movement to a target point is correctly and easily controllable, and such a robot apparatus is suitable for repetitive jobs in a predetermined location, such as line jobs at a plant etc.

Autonomous robots are more flexible, but cannot necessarily be correctly guided to a target position of an object. For example, there is known a method of driving a robot apparatus so that it may reach an exact location of an object by carrying an arm in the robot apparatus, attaching a camera to the arm, taking in an image of the object beforehand at the target position of the robot apparatus as a reference image, comparing the reference image with a present image of objects and based on a direction and a location of the camera, controlling movement of the robot so that the present image may be in agreement with the reference image, as disclosed in for example, Japanese patent application (Kokai) No. 2003-305676.

On the other hand, since the latter involves external factors, such as friction and a skid in tread with a floor, even if robot movement is exactly controlled, errors, such as in the form of a gap actually arise.

Therefore, if controls are performed only, for example by external sensors, such as sensors which remove a rotation amount of the wheel, a commanded movement will be different than actual movement.

Especially, by an advance direction shifting only somewhat at the time of changing the advance direction of the robot apparatus, if it moves after that, a large gap will arise in location.

SUMMARY OF THE INVENTION

According to one aspect of the present invention, there is provided a robot apparatus including a moving unit configured to move in a moving plane on flooring, and turn in a horizontal direction of the flooring about a rotation axis vertical to the flooring; an imaging unit configured to take images in a horizontal direction to the moving plane, and rotate in a horizontal direction of the flooring about the rotation axis; a storage unit configured to store the image taken by the imaging unit, when the moving unit receives a turning request of a command angle; a detector configured to detect a rotation angle of the imaging unit relative to the moving unit; a controller configured to control a turning of the moving unit and a rotating of the imaging unit based on a common value which makes the moving unit turn in a direction of the command angle and which makes the imaging unit rotate in an opposite direction, and based on a rate value which changes turning of the moving unit or rotating of the imaging unit so as to compensate a gap determined by comparing the taken image with the stored image; and a stop unit configured to stop the turning of the moving unit and the rotating of the imaging unit, when the command angle corresponds to the rotation angle detected by the detector.

According to another aspect of the present invention, there is provided a turning method for a robot apparatus included a moving unit configured to move in a moving plane on flooring, and turn in a horizontal direction of the flooring about a rotation axis vertical to the flooring, and an imaging unit configured to take an image in horizontal direction to the moving plane, and rotate in horizontal direction of the flooring about the rotation axis, comprising; storing a content of the image taken by the imaging unit, when the moving unit receives a turning request of a command angle; detecting a rotation angle of the imaging unit against the moving unit; controlling a turning of the moving unit and a rotating of the imaging unit based on a common value which makes the moving unit turn in a direction indicated by the command angle and which makes the imaging unit rotate in an opposite direction to the direction indicated by the command angle, and based on a rate value which changes turning of the moving unit or rotating of the imaging unit so as to compensate a gap determined by comparing the taken image with the stored image content; and stopping the turning of the moving unit and the rotating of the imaging unit, when the command angle corresponds to the detected rotation angle.

According to still another aspect of the present invention, there is provided a computer program product which stores program instructions which when executed by a computer controls movement of a robot apparatus, said robot apparatus including a moving unit configured to move on flooring, and turn in horizontal direction of the flooring about a rotation axis vertical to the flooring, and an imaging unit configured to take an image in horizontal direction to the moving plane, and rotate in horizontal direction of the flooring about the rotation axis, said program instructions producing execution of the steps comprising; storing a content of the image taken by the imaging unit, when the moving unit receives a turning request of a command angle; detecting a rotation angle of the imaging unit against the moving unit; controlling a turning of the moving unit and a rotating of the imaging unit based on a common value which makes the moving unit turn in a direction indicated by the command angle and which makes the imaging unit rotate in an opposite direction to the direction indicated by the command angle, and based on a rate value which changes turning of the moving unit or rotating of the imaging unit so as to compensate a gap determined by comparing the taken image with the stored image content; and stopping the turning of the moving unit and the rotating of the imaging unit, when the command angle corresponds to the detected rotation angle.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 9(a), 9(b), 9(c) and 9(d) are illustrations of examples of turning of the robot apparatus.

DETAILED DESCRIPTION OF THE PREFERRED EMBODIMENTS

Figure 1A:
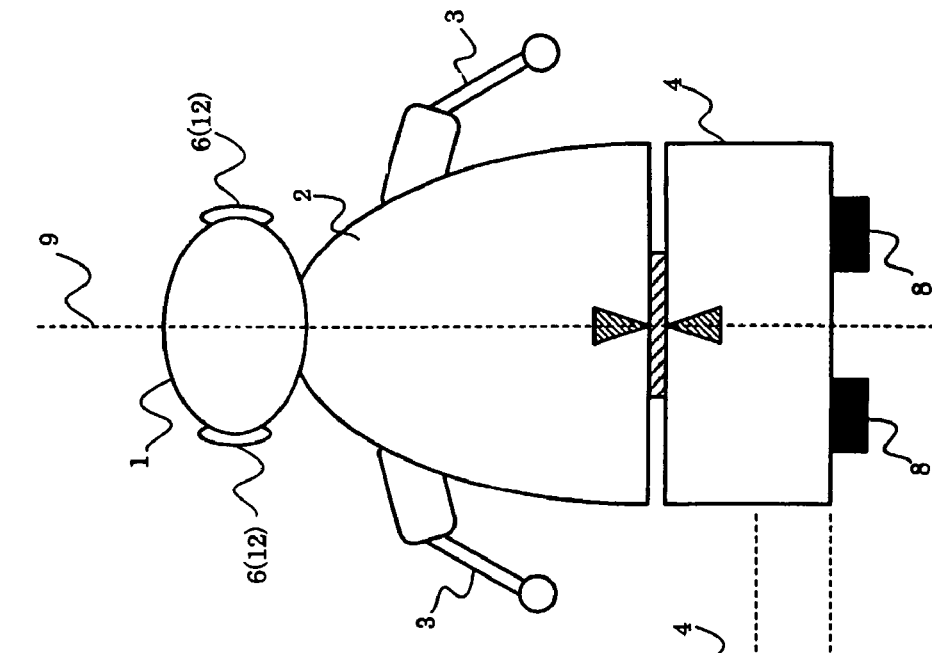
FIGS. 1(a), 1(b) and 1(c) are front, side and rear views showing an external appearance of a robot apparatus.
Figure 1B:
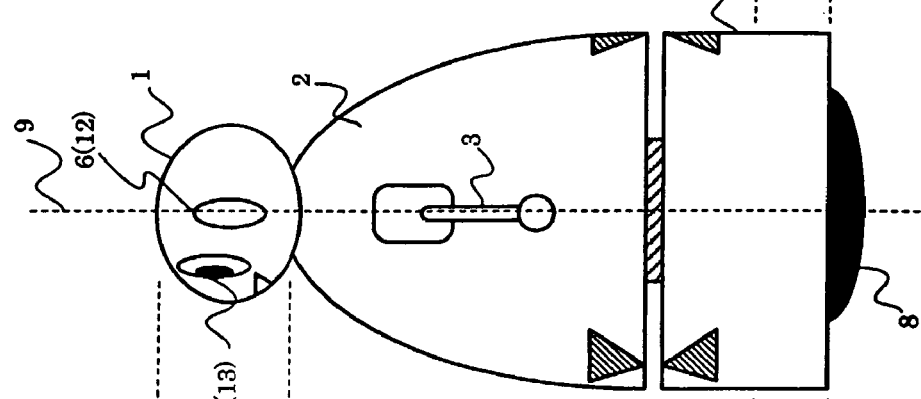
Figure 1C:
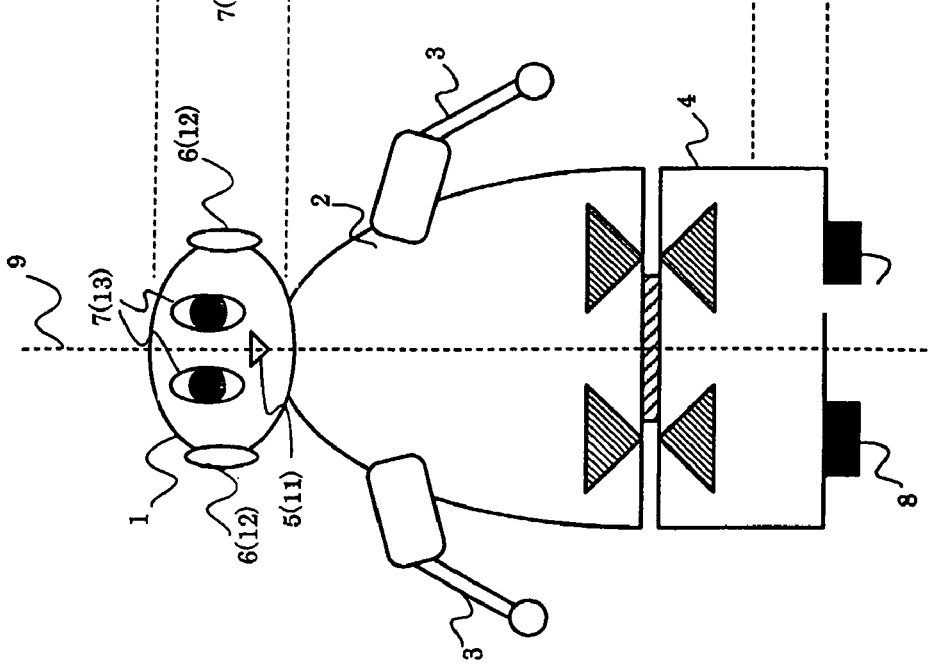

Referring now to the drawings, wherein like reference numerals designate identical or corresponding parts throughout the several views, the robot apparatus of the present invention is first described referring to FIGS. 1(a), 1(b) and 1(c), where it is seen that the robot apparatus of this embodiment may have a shape which is similar to that of human beings. As shown in FIGS. 1(a), 1(b) and 1(c), the robot apparatus of this embodiment includes a face unit 1, a main body 2, an arm unit 3, and a moving unit 4.

Shaded triangles on the main body 2 and the moving unit 4 are marks showing a relative location between the main body 2 and the moving unit 4. As shown in FIGS. 1(a), 1(b), and 1(c), when the front of main body 2 and the front of moving unit 4 are aligned, an apex of the shaded triangles accords with each other.

The face unit 1 has a mouth unit 5 including a speaker 11 which outputs sound, two ear units 6 including a microphone 12 which inputs a sound, and two eye units 7 including a camera 13 which takes an exterior image in horizontal direction to a moving plane surface.

The main body 2 is a central unit of the robot apparatus, and connects with the arm unit 3 and the moving unit 4 via respective rotation mechanisms. A robot control system 10, shown in FIG. 2, controls an action of the robot apparatus. Information processing, etc. is built into the main body 2.

In addition, although the face unit 1 and the main body 2 are shown as fixed, there may have a movable structure.

The arm unit 3 has a hand and some joints, and moves corresponding to patterns of human beings, like arms and hands of human beings.

The moving unit 4 has two same size wheels 8 which can be independently actuated, can make the robot apparatus go straight and back, change in right and left directions, further turn on the middle point of the wheels 8 by driving wheels 8 in opposite directions at same rate, and acts according to legs of human beings.

In addition, since it is actually difficult that the robot apparatus moves upright with only two wheels 8, in fact, the moving unit 4 is realized by having a further support part such as a third castored wheel, not shown.

Moreover, although specific shapes are shown in the drawings, various other shapes are possible.

A middle point between two wheels 8 of the moving unit 4 of the robot apparatus and a central point of the rotation mechanism between the moving unit 4 and the main body 2 are arranged so that a perpendicular shaft 9 may pass to the flooring (moving plane) and provide an axis of rotation.

That is, in the robot apparatus, the main body 2 and the moving unit 4 can rotate in horizontal direction of the flooring about an axis of rotation defined by the shaft 9.

Figure 2:
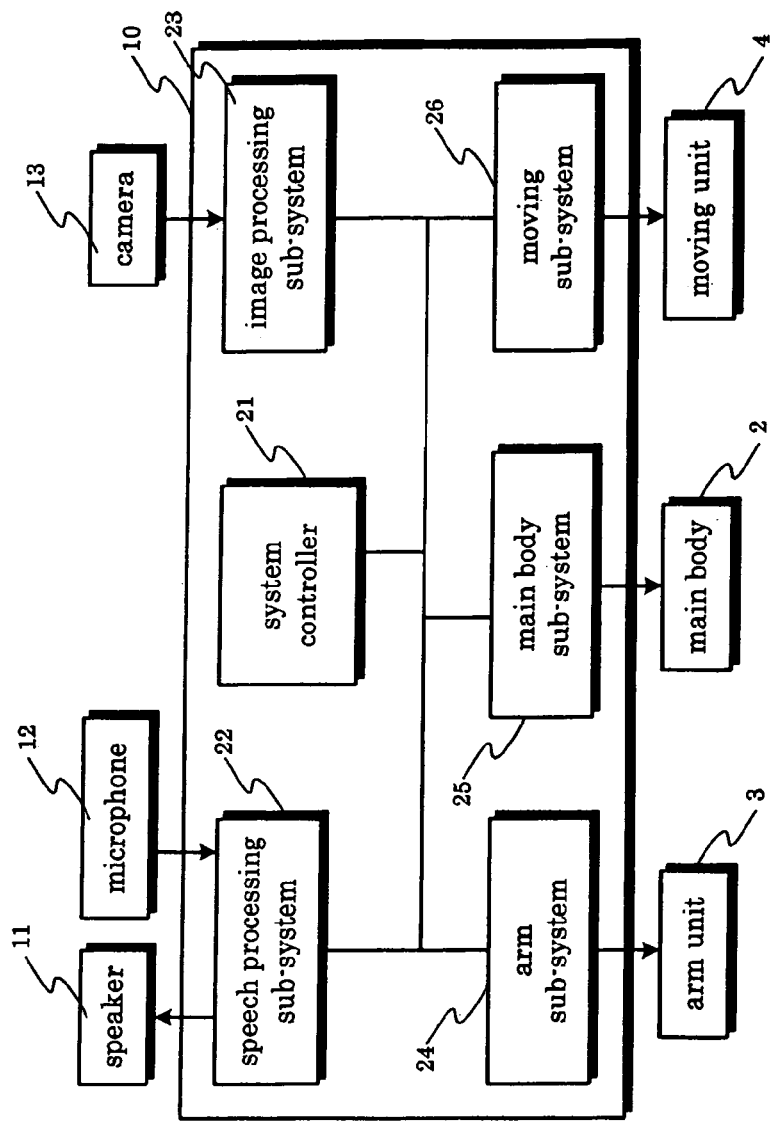
FIG. 2 is a block diagram showing functions of the robot apparatus.

FIG. 2 shows a system configuration of the robot apparatus.

The robot system 10 is divided roughly into a system controller 21 configured to decide actions and processing of the robot apparatus, and various subsystems 22 . . . 26 configured to apply information (hereafter, control input information) for deciding actions and processing of the robot apparatus in the system controller 21, and perform from information (hereafter, control output information) decided actions and processing of the robot apparatus in the system controller 21.

A speech processing sub-system 22 performs speech processing and may include an A/D conversion, D/A conversion, speech recognition, and speech synthesis, and applies the control input information needed in the system controller 21, sounds inputted via a microphone 11, and outputs sounds generated in the system controller 21 and the speech processing sub-system 22 via the speaker 12, the sounds being emitted to outside the robot apparatus.

Moreover, for example, the speech processing sub-system 22 may include processing as it automatically outputs voice response of throwing back a question through speech synthesis without the system controller 21, when input speech cannot be recognized well at the completion of processing closes inside the speech processing sub-system 22.

An image processing sub-system 23 recognizes input images from the camera 13, and applies the control input information needed in the system controller 21 among the information of recognized image, to the system controller 21.

Moreover, the image processing sub-system 23 has various processing functions concerning image processing of known tracking processing, such as processing which performs a distance measurement of an image pick-up of an object using a triangulation calculation based on images produced by two cameras 13, and further processing which always tracks the direction for image pick-up of an object and goes on picking-up the image of the object.

An arm sub-system 24 receives the control output information from the system controller 21, decides the physical drive quantity of each joint of the arm unit 3, and operates the arm unit 3.

A main body sub-system 25 decides the rotation of the main body 2 against the moving unit 4, and makes the main body 2 rotate by receiving control output information from the system controller 21, or receiving directly a physical quantity from a tracking processing function.

A moving sub-system 26 decides the rotation within a fixed time of each wheel 8, and makes each wheel 8 drive by receiving control output information from the system controller 21.

The system controller 21 decides actions or processing of the robot apparatus and, for example, decides one or more actions or processing according to predetermined rules, and outputs to one or more sub-systems which can process as control information received outside conditions (for example, information obtained from sounds and images) or inside conditions (for example, posture of the robot apparatus, and battery residual quantity etc.) as control input information.

In addition, although the robot apparatus of this embodiment has the above-mentioned sub-systems 22-26, the robot apparatus may also have, for example, a radio function, a display function, etc., as well as a radio sub-system which performs radio-communications processing, and a display sub-system which performs display control with a separately attached display apparatus.

Moreover, the robot apparatus may have a sub-system which controls various sensors for acquiring outside conditions, such as an infrared sensor.

Next, operation of the above-described embodiment is explained by reference to the flow charts of FIG. 3 to FIG. 5.

Figure 3:
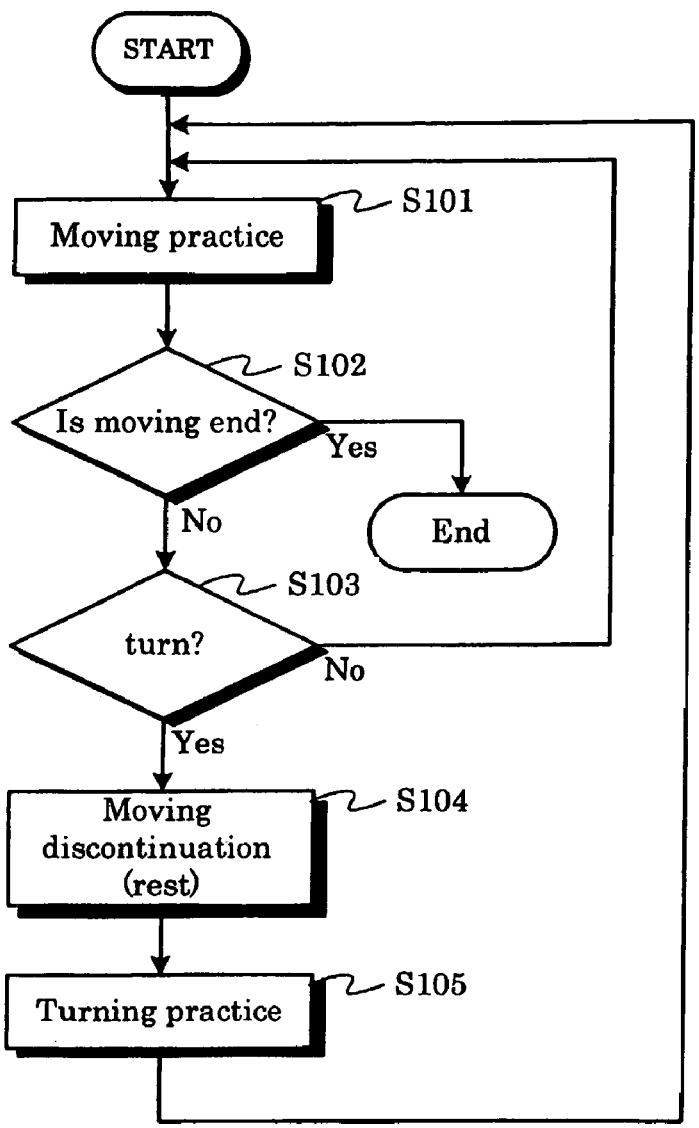
FIG. 3 is a flowchart showing processing procedures of movement in the robot apparatus.

FIG. 3 is a flow chart of the overall robot movement assumed, for example when the robot apparatus decides to move by giving the destination from an instruction by user's voice, the robot apparatus generates a route to the destination, and starts to move based on the route.

First, the robot apparatus practices (i.e., implements), moving based on the route (S101), and performs step by step checking whether moving is at an end, i.e. the robot has reached the destination (S102), and whether there is a turning demand or not, i.e., a moving direction change or not (S103).

If the robot apparatus reaches the destination ("Yes" of S102), it means that the moving is ended and processing is finalized.

If moving is not ended ("No" at S102), and if there is a turning demand ("Yes" at S103), the robot apparatus discontinues moving, rests still (S104), and changes the moving direction by practicing a turning action (S105).

After finalizing the practice of turning action, processing returns to the step S101, and the practice of moving is resumed.

In addition, according to the present invention, the turning demand may be generated, for example, by in the system controller 21 when the robot apparatus reaches a point of changing a direction during a movement along a moving route generated beforehand, or by an infrared sensor sub-system which is not shown when obstructions such as a wall are detected by the infrared sensor, or by the speech processing sub-system 22 when it receives voice instructions of turning from users, etc., or by various processing units according to embodiments in various cases. Other sources of turning demands are possible.

Furthermore, although in the following discussion the turning demand includes a turning direction and a turning angle, for convenience of explanation, it is not restricted to this since various variations according to other embodiments are considered within the scope of the present invention.

Next, details of the turning action of the step S105 in the moving practice are explained.

Figure 4:
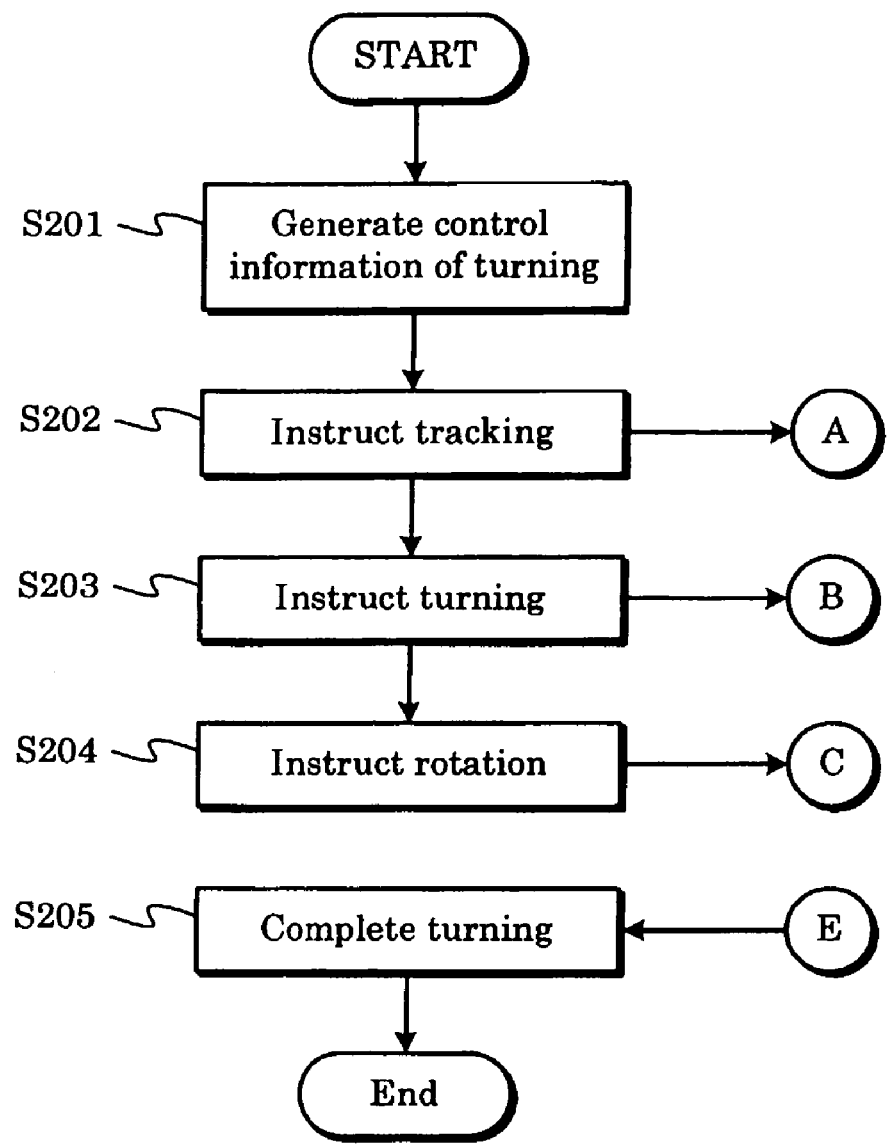
FIG. 4 is a flowchart showing processing procedures of turning in the system controller.
Figure 5:
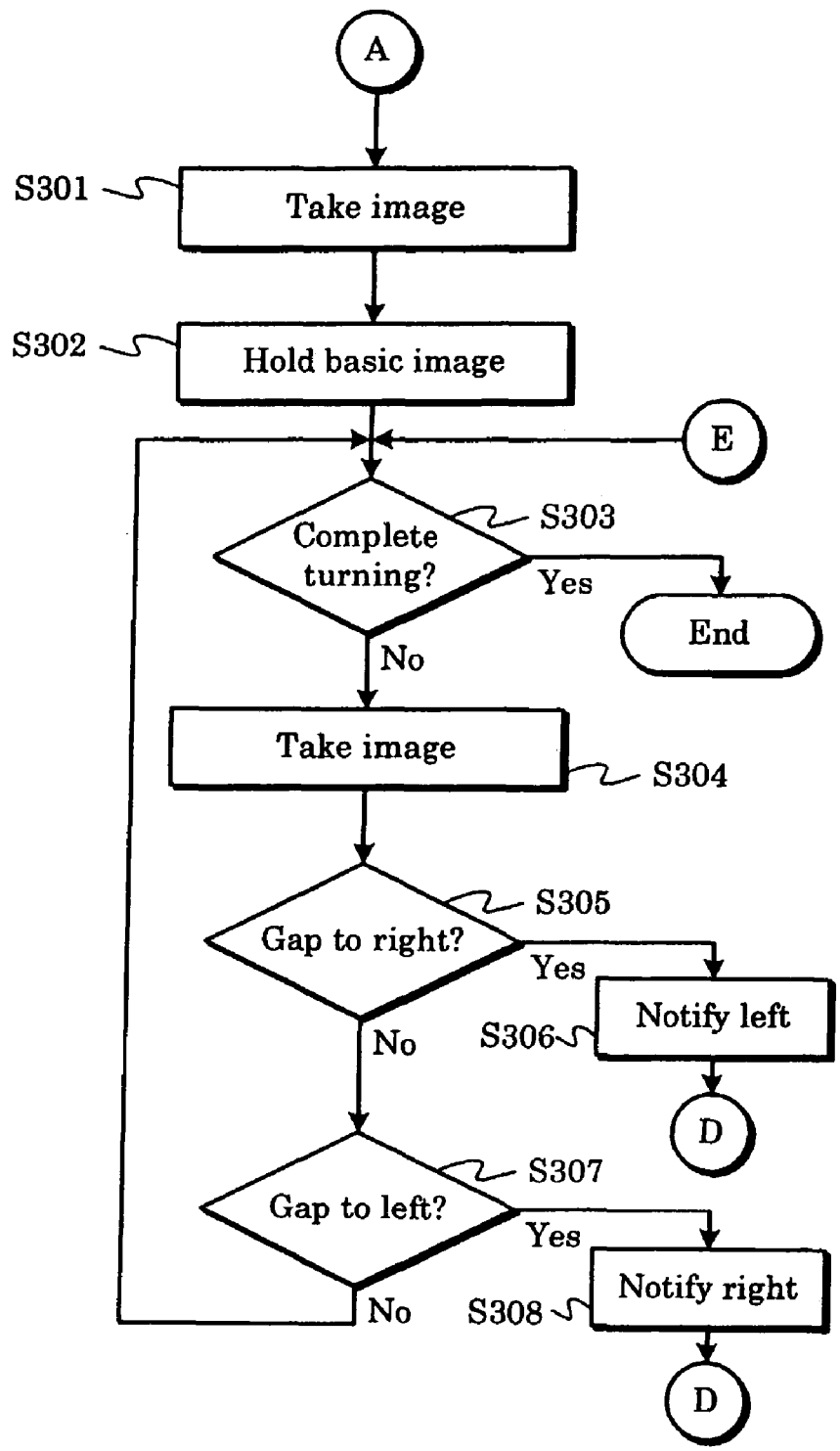
FIG. 5 is a flowchart showing processing procedures of turning in the image processing sub-system.
Figure 6:
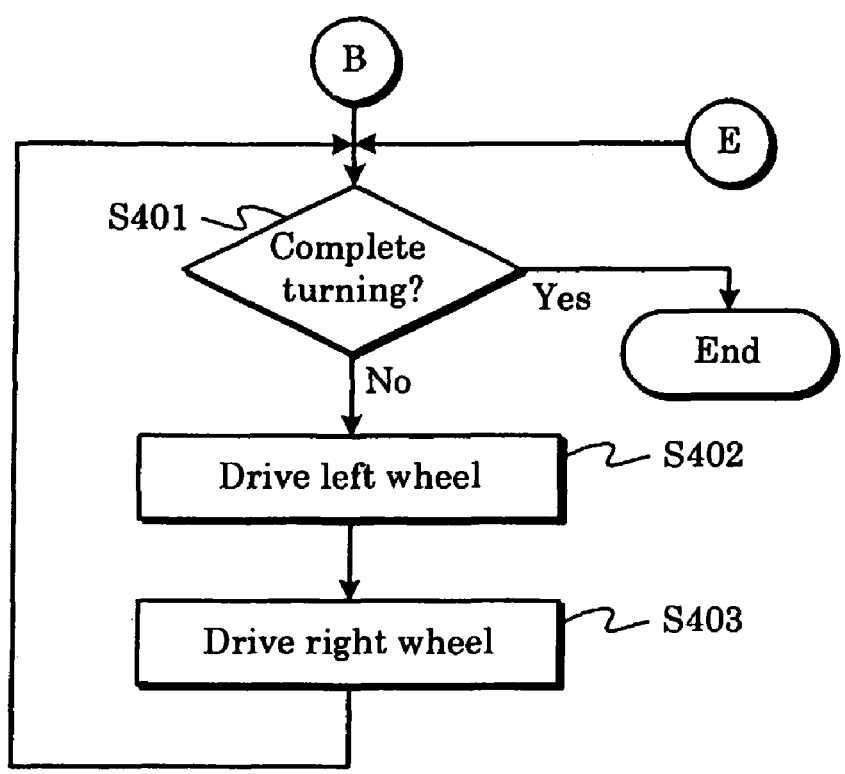
FIG. 6 is a flowchart showing processing procedures of turning in the main body sub-system.
Figure 7:
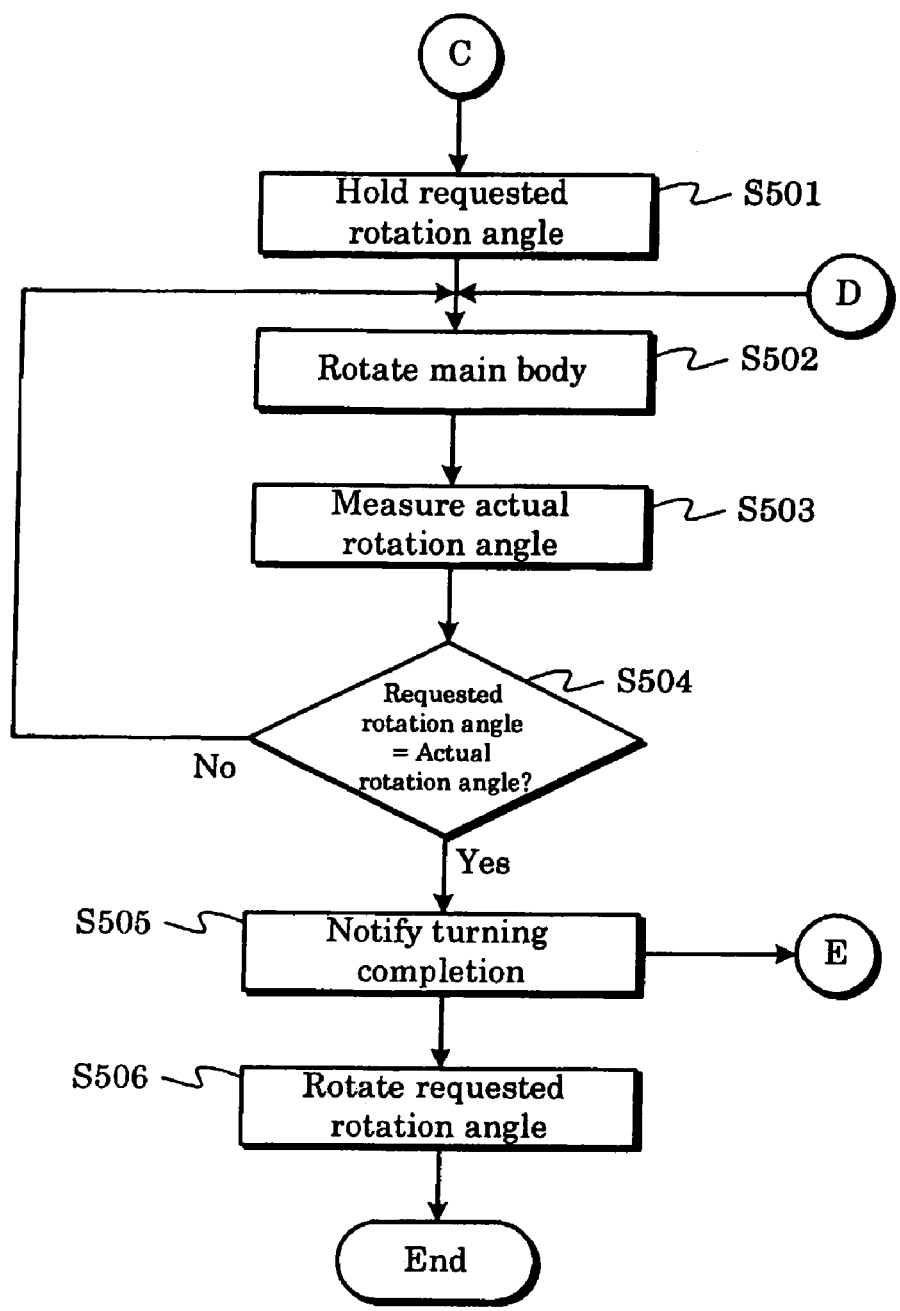
FIG. 7 is a flowchart showing processing procedures of turning in the moving sub-system.

FIG. 4 is a flow chart of steps performed by the system controller 21 when it implements the turning actions, and FIG. 5 to FIG. 7 are flow charts of sub-systems concerning turning actions, FIG. 5 is a flow chart of steps performed by the image processing sub-system 23, FIG. 6 is a flow chart of steps performed by the moving sub-system 26, and FIG. 7 is a flow chart of steps performed by the main body sub-system 25.

In order to perform the turning action, first, the system controller 21 obtains parameters, indicating what angle and in which (right/left) direction, included in the turning demand, and generates control output information for turning based on the obtained parameters (S201).

In one embodiment of the robot apparatus, as the control output information, the generated control output information includes a tracking instruction to the image processing sub-system 23, a turning instruction, including the direction indicated by the obtained parameters, to the moving sub-system 26, and a rotating instruction, including the direction and the angle in said parameters, to the main body sub-system 25. Such generated control output information are applied to each corresponding sub-system 23, 26, and 25 in parallel (S202, S203, S204).

The sub-systems 23, 26 and 25 to which the control output information is applied then operate in parallel as follows.

If the tracking instruction is applied as the control output information from the system controller 21, the image processing sub-system 23 takes an image with the camera 13 (S301), and holds the image as a basic image (S302).

In addition, before taking the image, if a facing direction of the main body 2 is different from the front face of the moving unit 4 for some reason, the robot apparatus may by default have processing which makes the front face of a body 2 turn to the same facing direction as the front face of the moving unit 4.

Next, the image sub-system 23 takes an image with the camera 13 periodically or irregularly (S304), compares the basic image and the taken image, checks whether the taken image has a gap to the right of the basic image (S305), or a gap to the left of the basic image (S307), and notifies a movement direction opposite to the gap direction to the main body sub-system 25 (S306, S308) until receiving a notice of turning complete (explained below) from the main body sub-system 25 ("No" of S303).

On the other hand, if the turning instruction supplied from the system controller 21 included direction as control output information, the moving sub-system 26 turns at this point in the direction of the turning instruction by driving wheels 8 in opposite direction from each other at the same rate, until receiving a notice of turning complete (explained below) from the main body sub-system 25 ("No" of S401).

On the other hand, as shown in FIG. 7, if the rotating instruction supplied from the system controller 21 included the direction and requested angle as control output information, the main body sub-system 25 holds the requested angle (S501). The main body sub-system 25 is then rotated in the angular velocity which reversed the positive/negative of said predetermined angular velocity and to which is added a sufficiently small compensation angular velocity (alpha on drawing) in the gap direction from the image processing sub-system 23 against the moving unit 4 (S502), the actual rotation angle rotated upon receiving the rotating instruction is measured (S503), and steps S502, S503 and S504 repeated until corresponding to the held requested angle ("Yes" of S504).

If the actual rotation angle corresponds to the held requested angle, the main body sub-system 25 outputs the notice of turning complete to the image processing sub-system 23 and the moving sub-system 26 (S505).

Default processing to rotate the main body 2 only the requested angle is performed (S506), and whereupon turn processing ends.

From the notice of turning complete, the image processing sub-system 23 ends the turning process by the step S303 and the moving sub-system 26 ends the turning process by the step S401.

An example of turning action of the robot apparatus in present embodiment by performing the above process action is explained by reference to FIGS. 8(a)-8(b) and FIGS. 9(a)-9(d).

Figure 8A:
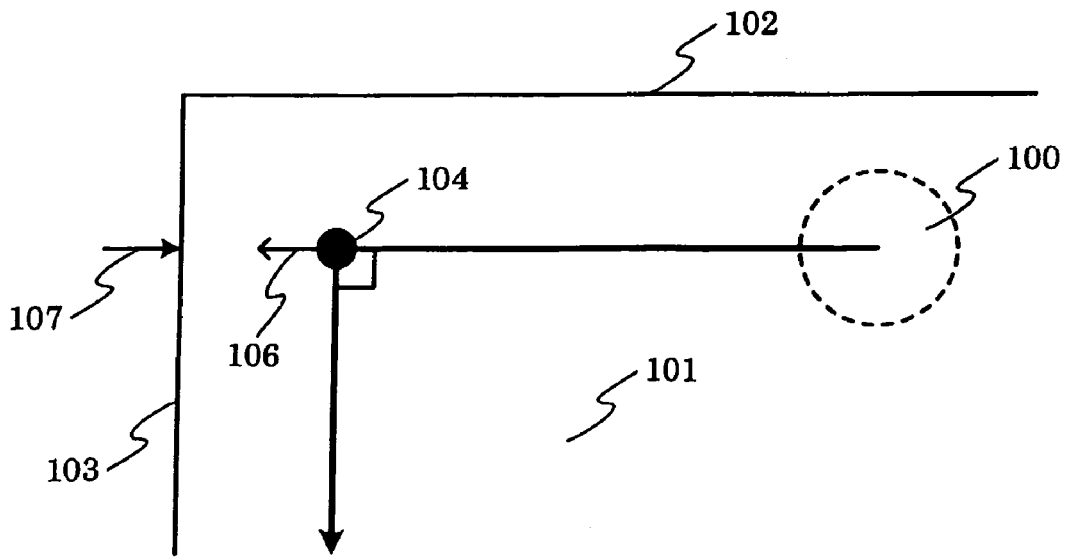
FIGS. 8(a) and 8(b) are illustrations of examples of turning of the robot apparatus.

This example assumes, as shown in the plane view of FIG. 8(a), the robot apparatus 100 goes to a point 104 along a wall 102 on flooring 101, turns to the left at a right-angle, and proceeds further along the wall 102.

Figure 8B:
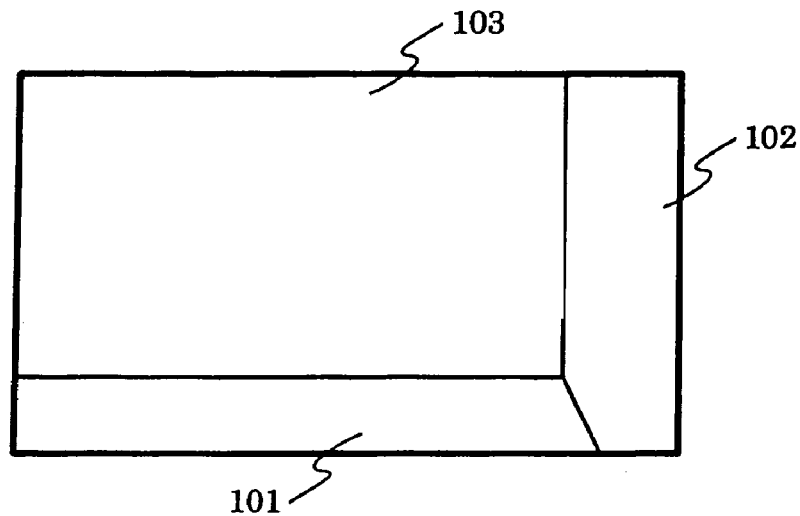

Moreover, a solid line arrow 106 shows a direction of the camera of the robot apparatus 100 at the point 104 (front face of the main body 2), and FIG. 8(b) shows an example of the image taken with the camera at this time.

In addition, a boundary line of the wall 102 and the wall 103 is extracted a vertical line from the image of FIG. 8(b), and here, the extracted vertical line is used for gap detection.

Moreover, the solid line arrow 107 illustrates the direction of viewing the point 104 from a vertical part of the wall 103 corresponding to the point 104.

The top view of FIG. 9(a) shows a camera direction when the robot apparatus 100 starts the turning action with the requested turning when it moves to the point 104; the middle view shows an image of the boundary line at that time, and the lower view shows an area of the main body 2 and the moving unit of the robot apparatus 100 seen from the direction of arrow 107. In addition, the image shown in the middle view at this time is held as a basic image. Since both the front of main body 2 and the front of moving unit 4 are aligned, an apex of the shaded triangles accords with each other.

FIG. 9(b) shows an example of a gap arising with a skid of wheels 8 when the robot apparatus 100 turns, the camera (the main body 2) has a gap to the right of the original direction as shown in the top, and as a result, the image obtained from the camera has the boundary line on the left of the basic image as shown in the middle.

Moreover, as shown in the lower view of FIG. 9(b), although the moving unit 4 turns to the right, on the other hand the main body 2 has a gap to the left of it when seen from the arrow 107.

At this time, the main body 2 rotates to the right at a velocity determined by adding the compensation angular velocity to usual rotating rate.

FIG. 9(c) is drawing at the time of completion of turning at the location shown in FIG. 9(b), wherein further turning is performed and completed (the measured angle corresponds with the requested angle), the camera (the main body 2) faces the original direction as shown in the top view of FIG. 9(c), the image obtained from the camera as a result (no gap) corresponds with the basic image as shown in the middle view of FIG. 9(c), and although the moving unit 4 turns 90 degrees to the right, on the other hand, the main body 2 looks forward when seen from the arrow 107.

That is, the moving unit 4 and the main body 2 have a correct 90 degrees relation, and the moving unit 4 has been correctly turned 90 degrees from the time of turning demand.

FIG. 9(d) shows the main body 2 rotated 90 degrees and the turning action is finalized at the point 104.

That is, in the top view of FIG. 9(d), the direction of the camera shows the direction turned 90 degrees, there is no image in the middle since taking the image is finalized, and the lower view of FIG. 9(d) shows the main body 2 and the moving unit 4 are both turned to face forward. Since the front of main body 2 and the front of moving unit 4 are aligned, an apex of the shaded triangles accords with each other.

In addition, although the rotating rate of the moving unit 4 is at fixed speed and the rotating rate of a main body 2 is compensated to the gap in the above embodiment, vice versa, the rotating rate of a main body 2 may be at fixed speed and the rotating rate of the moving unit 4 may be compensated to the gap.

In this case, for example, the step S306 and S308 of FIG. 5 may be reversed (reverse right and left), and the compensation angular velocity (alpha) added in the step S502 may change to adjusting the drive of the left wheel and the right wheel in the step S402 and S403 of the moving sub-system 26.

Figure 10:
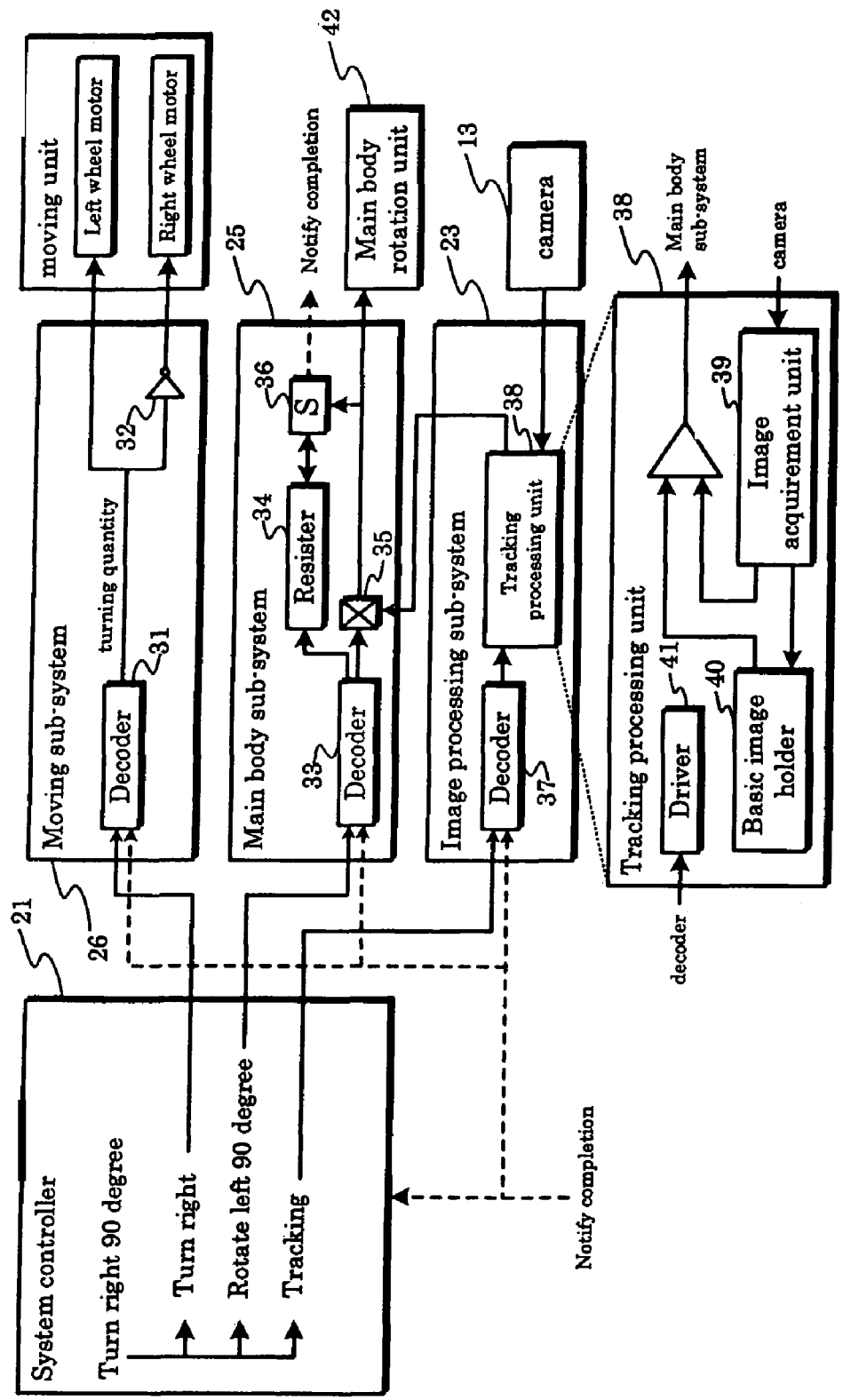
FIG. 10 is a block diagram showing functions of the robot apparatus.

FIG. 10 shows a process flow of the embodiment explained above as a block diagram illustrating functions being performed.

The system controller 21 generates commands for processing of a turning right, a rotating left 90 degree, and tracking in parallel as control output information, when it receives, for example, the turning request of turning right 90 degree.

The system controller 21 outputs a turning right control signal to the moving sub-system 26, a rotating left 90 degree control signal to the main body sub-system 25, and a tracking control signal to the image processing sub-system 23, respectively.

When the tracking control signal is decoded by the decoder 37, the image processing sub-system 23 notifies a start of action to a driver 41 which drives a tracking processing unit 38, and makes the action start.

Further, the tracking processing unit 38 acquires an image in an image acquisition unit 39, and the image at the time of the start is held in a basic image holder 40. The tracking processing unit 38 suitably acquires additional images after the time of a start, compares the later acquired image with the image held in the basic image holder 40, detects a gap if there is a gap between the image, and produces a value which shows a gap direction to the main body sub-system 25, image by image.

The moving sub-system 26 includes a decoder 31 which decodes a command of turning right, and outputs driving rates of wheels to the moving unit 4.

Here, in the right turning, commands are given to a left wheel motor to turn in the positive direction, and to a right wheel motor to turn in the negative direction so that each wheel rotates an equal but opposite amount.

If the decoder 33 in the main body sub-system 25 decodes a rotate left 90 degree command, the 90 degree command is stored in a register 34, and a rotating rate output to a main body rotation unit 42.

Main body sub-system 25 includes a switch 35 whereby the compensation rotating rate may be added or subtracted to and from the rotating rate based on the value which shows the gap direction from the image processing sub-system 23, so that the actual rotating rate of the main body rotation unit 42 is changed, and unit 42 rotated.

Moreover, this actual rotating rate is integrated by an angle detector 36. When this integrated value determined by detector 36 corresponds to a 90 degree rotation which is requested and stored in the register 34, it means that correct 90 degree to the right has been implemented from the time of a turning request, and detector 36 then notifies a rotating completion.

This notice is given to the system controller 21, the moving sub-system 26, the image processing sub-system 23, and the main body subsystem 25, and the system controller 21 checks what turning request operation is finalized, and the image processing sub-system 23 and the moving sub-system 26 stop an action.

Moreover, by rotating the main body 2 only to the 90 degrees requested, the main body sub-system 25 returns to the posture of the robot apparatus at the time of the turning request, and stops the action.

As above explained in detail, the robot apparatus of the present embodiment compensates the gap easily upon turning in response to the turning request, so that it can turn correctly.

In addition, the requested rotating may be realized by dividing the angle into increments and rotating incrementally in the increments to which the angle which can be resolved, when the main body 2 cannot rotate the entire angle at once since the angle which can be rotated at once in the main body 2 to the moving unit 4 is small.

By practicing in this way, even if it may receive a turning request at any angle, a corresponding turning can be implemented.

The present invention includes processing of signals input to a robot apparatus and/or generated by one or more subsystems of the subject invention, and programs by which such signals are processed. Such programs are typically stored and executed by a processor implemented in VLSI. The processor typically includes or operates in conjunction with a processor storage product, i.e., an electronic storage medium, for storing program instructions containing data structures, tables, records, etc. Examples of storage media are electronic memories including PROMs (EPROM, EEPROM, flash EPROM), DRAM, SRAM, SDRAM, FRAM, or any other magnetic medium, or any other medium from which a processor can read, for example compact discs, hard disks, floppy disks, tape, magneto-optical disks.

The electronic storage medium according to one embodiment of the invention may include one or a combination of processor readable media, to store software employing computer code devices for controlling the processor. The processor code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

Numerous additional modifications and variations of the present invention are possible in light of the above teachings. It is therefore to be understood that within the scope of the appended claims, the present invention may be practiced otherwise than as specifically described herein.

What is claimed is:

1. A robot apparatus comprising:
a moving unit configured to move in a moving plane on flooring, and to turn in a horizontal direction of the flooring about a rotation axis vertical to the flooring;
an imaging unit configured to take images in a direction horizontal to the moving plane, and to rotate in the horizontal direction of the flooring about said axis;
a storage unit configured to store a content of the image taken by the imaging unit, when the moving unit receives a turning request of a command angle;
a detector configured to detect a rotation angle between the stored image content and an actual rotation of the moving unit;
a controller configured to control a turning of the moving unit and a rotating of the imaging unit based on a difference between images captured by the imaging unit, wherein the controller causes the moving unit to turn in a direction of the command angle and the imaging unit to rotate in a direction opposite to the direction of the command angle so as to eliminate the difference between the images, and then causes the imaging unit to rotate in the direction of the command angle; and
a stop unit configured to stop the turning of the moving unit and the rotating of the imaging unit, when the command angle corresponds to the rotation angle detected by the detector.

2. The robot apparatus of claim 1, wherein
the controller includes a $1^{st}$ control unit configured to control a turning of the moving unit at a turning rate and in a turning direction defined by the command angle, and a $2^{nd}$ control unit configured to control a rotating of the imaging unit by rotating the imaging unit at said turning rate and in a direction opposite to the direction defined by the command angle; and
the detector includes a $1^{st}$ detector unit configured to detect a direction of a gap determined by comparing the taken image with the stored image content, and a $2^{nd}$ detector unit configured to detect a rotation angle of the imaging unit relative to the moving unit.

3. The robot apparatus according to claim 2, wherein the content stored by the storage unit is an image taken by the imaging unit.

4. The robot apparatus according to claim 2, wherein the image content stored by the storage unit comprises extraction information acquired from the image taken by the imaging unit.

5. The robot apparatus according to claim 1, wherein the image content stored by the storage unit is an image taken by the imaging unit.

6. The robot apparatus according to claim 1, wherein the image content stored by the storage unit comprises extraction information acquired from the image taken by the imaging unit.

7. A turning method for a robot apparatus including a moving unit configured to move in a moving plane on flooring, and turn in a horizontal direction of the flooring about a rotation axis vertical to the flooring, and an imaging unit configured to take an image in horizontal direction to the moving plane, and rotate in horizontal direction of the flooring about the rotation axis, comprising;
storing a content of an image taken by the imaging unit when the moving unit receives a turning request of a command angle;
detecting a rotation angle of the imaging unit against the moving unit;
controlling a turning of the moving unit and a rotating of the imaging unit based on a difference between images captured by the imaging unit, by causing the moving unit to turn in a direction indicated by the command angle and the imaging unit to rotate in an opposite direction to the direction indicated by the command angle so as to eliminate the difference between the images, and then causing the imaging unit to rotate in the direction of the command angle; and
stopping the turning of the moving unit and the rotating of the imaging unit, when the command angle corresponds to the detected rotation angle.

8. A computer readable storage medium which stores program instructions which when executed by a computer control movement of a robot apparatus, said robot apparatus including a moving unit configured to move on flooring, and turn in horizontal direction of the flooring about a rotation axis vertical to the flooring, and an imaging unit configured to take an image in horizontal direction to the moving plane, and rotate in horizontal direction of the flooring about the rotation axis, said program instructions producing execution of the steps comprising;

storing a content of the image taken by the imaging unit when the moving unit receives a turning request of a command angle;

detecting a rotation angle of the imaging unit against the moving unit;

controlling a turning of the moving unit and a rotating of the imaging unit based on a difference between images captured by the imaging unit, by causing the moving unit to turn in a direction indicated by the command angle and the imaging unit to rotate in an opposite direction to the direction indicated by the command angle so as to eliminate the difference between the images, and then causing the imaging unit to rotate in the direction of the command angle; and stopping the turning of the moving unit and the rotating of the imaging unit, when the command angle corresponds to the detected rotation angle.

* * * * *